US007669011B2

(12) United States Patent
Conway

(10) Patent No.: US 7,669,011 B2
(45) Date of Patent: Feb. 23, 2010

(54) METHOD AND APPARATUS FOR DETECTING AND TRACKING PRIVATE PAGES IN A SHARED MEMORY MULTIPROCESSOR

(75) Inventor: Patrick N. Conway, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 432 days.

(21) Appl. No.: 11/644,488

(22) Filed: Dec. 21, 2006

(65) Prior Publication Data

US 2008/0155200 A1   Jun. 26, 2008

(51) Int. Cl.
G06F 12/08   (2006.01)
(52) U.S. Cl. .................. 711/146; 711/124; 711/141; 711/202; 711/E12.026
(58) Field of Classification Search ............... 711/124, 711/141, 146, E12.026
See application file for complete search history.

(56) References Cited

U.S. PATENT DOCUMENTS

| | | | | |
|---|---|---|---|---|
| 5,265,232 | A | * | 11/1993 | Gannon et al. .............. 711/124 |
| 5,584,017 | A | * | 12/1996 | Pierce et al. ............... 711/146 |
| 6,044,446 | A | | 3/2000 | Joy |
| 6,868,485 | B1 | | 3/2005 | Conway |
| 7,047,322 | B1 | * | 5/2006 | Bauman et al. ............... 710/6 |
| 7,096,323 | B1 | | 8/2006 | Conway |
| 7,472,253 | B1 | * | 12/2008 | Cameron et al. ............ 711/203 |
| 2007/0022255 | A1 | * | 1/2007 | Cantin et al. ............... 711/144 |

OTHER PUBLICATIONS

Moshovos; "RegionScout: Exploiting Coarse Grain Sharing in Snoop-Based Coherence"; Computer Architecture, 2005. ISCA '05. Proceedings. 32nd International Symposium on Computer Architecture; Jun. 4-8, 2005; pp. 234-245.
Cantin; "Coarse-Grain Coherence Tracking;" Dissertation; University of Wisconsin at Madison; Jan. 2006.
Cantin, et al; "Coarse-Grain Coherence Tracking: Regionscout and Region Coherence Arrays," IEEE Micro, vol. 26, No. 1, pp. 70-79, Jan./Feb. 2006.

* cited by examiner

*Primary Examiner*—Matt Kim
*Assistant Examiner*—Michael C Krofcheck
(74) *Attorney, Agent, or Firm*—Meyertons, Hood, Kivlin, Kowert & Goetzel, P.C.

(57) ABSTRACT

A processor includes a processor core coupled to an address translation storage structure. The address translation storage structure includes a plurality of entries, each corresponding to a memory page. Each entry also includes a physical address of a memory page, and a private page indication that indicates whether any other processors have an entry, in either a respective address translation storage structure or a respective cache memory, that maps to the memory page. The processor also includes a memory controller that may inhibit issuance of a probe message to other processors in response to receiving a write memory request to a given memory page. The write request includes a private page attribute that is associated with the private page indication, and indicates that no other processor has an entry, in either the respective address translation storage structure or the respective cache memory, that maps to the memory page.

21 Claims, 4 Drawing Sheets

METHOD AND APPARATUS FOR DETECTING AND TRACKING PRIVATE PAGES IN A SHARED MEMORY MULTIPROCESSOR

BACKGROUND OF THE INVENTION

1. Field of the Invention

This invention relates to multiprocessing computer systems and, more particularly, to cache coherence protocols in those systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various specific coherency protocols are well known. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 64 byte and 128 byte blocks are often used.

Many coherency protocols include the use of probes to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor) to read or write the block. Each probe receiver responds to the probe, and once the probe responses are received the command may proceed to completion. The coherency point is the component responsible for maintaining coherency, e.g. a memory controller for the memory system.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requestor and invalidating its copy, if necessary.

In contrast, systems employing directory-based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are well known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In such environments, systems employing directory protocols may attain overall higher performance due to lessened network traffic and the avoidance of network bandwidth bottlenecks. However, it may be desirable to improve upon the above systems by enhancing probe filtering operations to further limit the number of probes that are broadcast.

SUMMARY

Various embodiments of a system and method for detecting and tracking private pages in shared memory multiprocessor are disclosed. In one embodiment, a processor includes a processor core coupled to interface logic and to an address translation storage structure. The processor also includes a memory controller coupled between the processor core and a local system memory. The interface logic may be configured to control communication with other processors. The address translation storage structure includes a plurality of entries, each corresponding to a memory page. Each entry also includes a physical address of a memory page, and a private page indication that indicates whether any other processor has an entry, in either a respective address translation storage structure or a respective cache memory, that maps to the memory page. The memory controller may be configured to inhibit issuance of a probe message to each other processor in response to receiving a write memory request to a given memory page. The write request includes a private page attribute that is associated with the private page indication, and indicates that no other processor has an entry, in either the respective address translation storage structure or the respective cache memory, that maps to the memory page. In one specific implementation, the private page indication may be a bit maintained in hardware and inaccessible to software executing on the processor core.

In another specific implementation, in response to receiving a write memory request to a particular memory page that includes an attribute that indicates the write memory request is a first write memory request subsequent to a first access for the particular memory page, the memory controller may be configured to issue a specific probe message to each other processor. The specific probe message may cause each other processor core to search each entry of the respective address translation storage structure and each entry of the respective cache structure for any address that maps to the particular memory page.

In yet another specific implementation, the processor core further includes control logic configured to search each entry of the respective address translation storage structure and each entry of the respective cache memory for any address that maps to a requested memory page in response to receiving, from a requesting processor, the specific probe message corresponding to the requested memory page.

Figure 1:
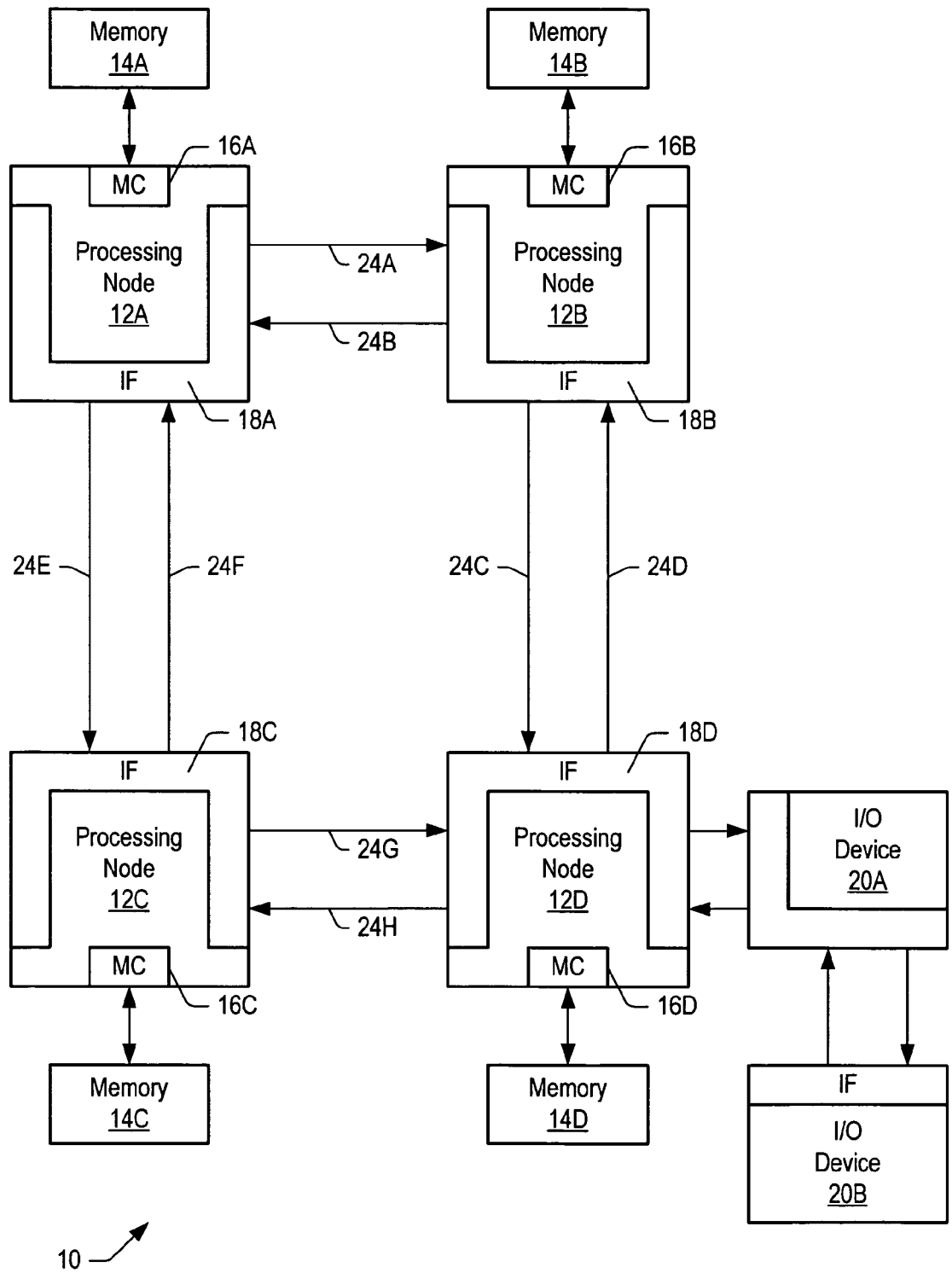
FIG. 1 is a block diagram of an embodiment of a multiprocessing computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a multiprocessing computer system 10 is shown. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 1, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node (e.g., 12C) may communicate with an I/O bridge (not shown) which is coupled to an I/O bus (not shown). It is noted that components having a reference number and letter (e.g., 12A) may be referred to by just the number where appropriate.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 1. The link may be operated in a cache coherent fashion for communication between processing nodes or in a noncoherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes 12 than the embodiment shown in FIG. 1. In addition, other embodiments are possible in which each processing node 12 is coupled to every other processing node 12 through a point-to-point network.

In addition to the depicted memory controller and interface logic, each processing node 12A-12D may include one or more processor cores and associated caches, as described further below. Broadly speaking, a processing node comprises at least one processor and may optionally include a memory controller for communicating with a memory and other logic, as desired.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable flow control mechanism for transmitting packets.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Communications between processing nodes 12A-12D of computer system 10 may be accommodated using various specific packet-based messaging, as desired. For example, in one embodiment, the packet-based links may operate according to the HyperTransport™ protocol. It is noted that other embodiments are possible and contemplated, including embodiments employing other suitable protocols, or embodiments that employ bus based communication mechanisms.

Figure 2:
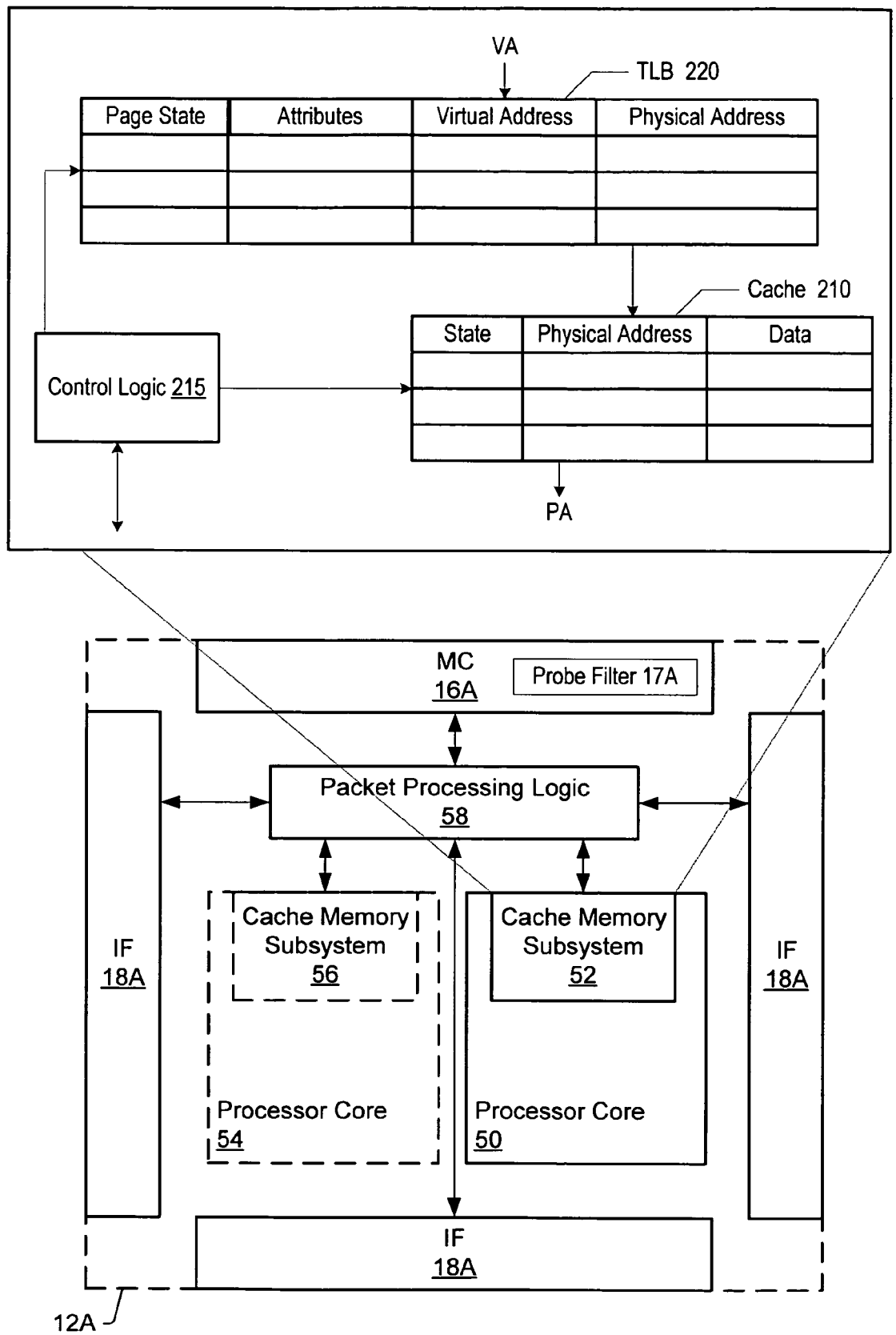
FIG. 2 is a block diagram of an embodiment of a processor including a number of processor cores.

Referring to FIG. 2, a block diagram of an exemplary embodiment of processing node 12A of FIG. 1 is shown. Circuit portions that correspond to those of FIG. 1 are numbered identically. Processing node 12A includes a memory controller 16A, interface logic 18A, a processor core 50, a cache memory subsystem 52 and packet processing logic 58. Processing node 12A may also include one or more additional processor cores 54 and cache memory subsystems 56, as desired. In one embodiment, the illustrated functionality of processing node 12A is incorporated upon a single integrated circuit. Processing nodes 12B-12D may be configured similarly.

Generally, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Processor cores 50 and 54 include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected, a read request is generated and transmitted to the memory controller within the node to which the missing block is mapped.

Cache subsystems 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an inline configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent L2 cache structures.

As shown in the exploded view, the illustrated embodiment of cache memory subsystem 52 includes a cache storage 210, control logic 215, and a translation lookaside buffer (TLB) 220. In the illustrated embodiment, cache storage 210 includes a plurality of entries. As shown, each entry stores a number of data blocks and a corresponding physical addresses of those data blocks. In one embodiment, each entry may correspond to a coherence unit such as a cache line, for example. As such, the address may be the cache line address of the first data block in the cache line. In one embodiment, each entry may further store coherence state information (e.g., directory information) for those data blocks. As such, the directory information may be maintained and used by probe filter 17A to filter probe command and response traffic for certain transactions (e.g., fetches and loads). It is noted that in one embodiment, probe filter 17A may filter probes that may issue due to fetch and load operations. Embodiments of an exemplary probe filter are described in U.S. Pat. No. 6,868,485, which is herein incorporated by reference, in its entirety.

Rather than storing directory entries in a dedicated directory storage, directory entries may be stored in designated locations of cache memory subsystem 52 (and cache memory subsystem 56, depending upon the implementation). By utilizing cache memory subsystem 52 for the storage of directory entries, the need for a separate directory storage may be avoided. As a result, overall cost may be reduced, as well as required board area, power consumption, and cooling requirements. In addition, embodiments are possible in which utilization of cache memory subsystem 52 for the storage of directory entries may be selectively enabled based upon whether the subsystem is deployed in a single-processor environment or a multiple-processor environment. Thus, when deployed in a single-processor environment, the storage locations of the cache memory subsystem may be utilized exclusively for processor-caching operations, and the waste (i.e., non-utilization) of dedicated directory storage may be avoided.

In the illustrated embodiment, TLB structure 220 includes a plurality of entries that store the virtual to physical address translations of memory pages that are requested during memory requests. Accordingly, each entry in the TLB 220 includes the virtual and physical address of the page, any page attributes, and the page state. More particularly, the page attributes may include a first access attribute, for example, that may be indicative of whether or not the page in that entry has had a first store access after a TLB miss. For example, if the first access is a load or fetch, the first access attribute may be clear. As described further below, in one embodiment, this attribute may be set once the first store operation hits on this entry or if the entry is created in response to a store operation causing the TLB miss.

The page state information may include an encoding of one or more bits that represent the coherence state of the page. Table 1 below, shows an exemplary encoding of the coherence states. In one embodiment, the page state field of each TLB entry may be implemented as a hardware entity that is created and maintained in hardware. As such, the page state field is not part of the programmer visible page table or page table entry, and is not accessible by the operating system or application software. As will be described in greater detail below, the page state information may be used to track whether a memory page is private. Depending on whether a page is private, memory controller 16A may determine whether to issue a probe message in response to receiving a write request to the memory page.

TABLE 1

Exemplary page state field encodings

| Write after TLB Miss | Private Page | Description |
|---|---|---|
| 0 | X | Initial state after a TLB miss for an instruction fetch or data load. |
| 1 | 1 | This page is private to this thread. |
| 1 | 0 | The page is not private and is possibly shared by multiple threads running on multiple cores. |

As shown in Table 1, the first row illustrates an encoding of the initial coherence state of an entry in the TLB resulting from a TLB miss of fetch or load operation. The page has not been written by the current thread since the TLB miss. The 'X' entry in Table 1 reflects a "don't care" condition. The page may or may not be private, and multiple cores may have a TLB entry mapping to the same page with this page state encoding. The second row in Table 1 illustrates an encoding for a private page. More particularly, a "private page" refers to a page in which exactly one core has a TLB entry mapping to this page, and no other core has a cache line on the page. For a page in this state, cache coherence is maintained on a page granularity. This thread wrote to the page and a SuperProbe was issued for the first store access to this page. The responses to the SuperProbe indicated the page is private. The third row illustrates an encoding of a page that is not private and that may be shared by other threads. For a page in this state, cache coherence is maintained on a cache line granularity. The Private bit is cleared in store requests sent to memory.

As mentioned above, the private page bit may be set by control logic 215 in response to receiving probe responses that indicate no other cache or TLB of any other processor core has an entry that maps to the requested page. As such, in one embodiment, memory controller 16A may refrain from issuing any probes to other processor cores in response to receiving a write request that includes a private page attribute that indicates the requested page is private. In addition, in one embodiment, memory controller 16A may issue (i.e., broadcast) a special probe, referred to as a SuperProbe, in response to receiving a first write request to a page after a TLB miss to that page. In one embodiment, in response to receiving a SuperProbe, control logic 215 may include hardware (e.g., sequencer hardware) that may search all TLB entries by physical address and all cache entries for an address that maps to (i.e., is within the range of addresses for the requested page) the requested page.

Figure 3:
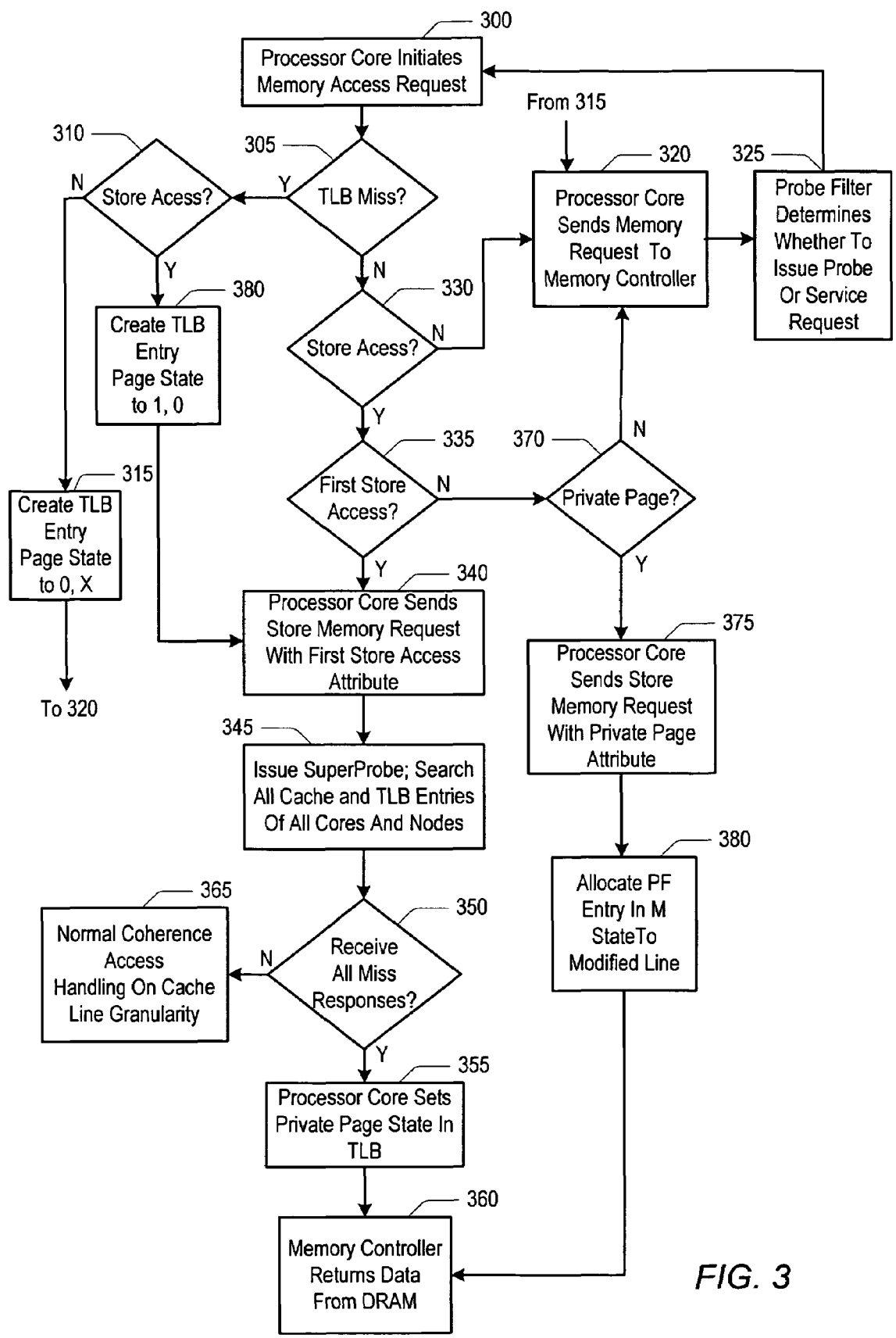
FIG. 3 is a flow diagram describing the operation of the embodiments shown in FIG. 1 and FIG. 2.

FIG. 3 is a flow diagram describing the operation of the embodiments shown in FIG. 1 and FIG. 2. Referring collectively now to FIG. 1 through FIG. 3, a processor core (e.g., 50) issues a request to memory (block 300). The paging mechanism in the processor core may search TLB 220 for the physical address corresponding to the requested page. If the search results in a TLB miss (block 305), and the access request is not a store operation, (e.g., fetch or load) (block 310), processor core address translation hardware generates a physical address translation and stores it in an entry of TLB 220. Since this is not a store operation, the first access attribute is set to indicate that a first store access to the page has not occurred. In addition, the page state field of the entry may be encoded with a 0, X to indicate that there was a TLB miss, but a write to that page has not occurred and the page may or may not be private (block 315). Processor core sends the memory request to memory controller 16A (block 320). Probe filter 17A may determine whether to issue a probe or service the request dependent upon, for example, any directory information that may be available as described above (block 325). Operation returns to block 300.

Referring back to block 310, if however the access request is a store operation, since this is a store operation, the first access attribute is set to indicate that a first store access to the page has occurred, and the page state field of the entry may be encoded with a 1, 0 to indicate that there was a TLB miss, a write to that page has occurred after a TLB miss, and that the page may or may not be private (block 320).

Processor core 50 then issues the store request to the memory controller 16A with the first access attribute set (block 340). In one embodiment, the store request may be a write command packet that includes a first access attribute field that has an encoded value indicating that the store request is a first store access to the page. Memory controller 16A receives the request and since it is a first store after a TLB miss, memory controller 16A issues a SuperProbe as described above (block 345). In response, all processor cores (e.g., 52, etc.) receiving the SuperProbe may search their respective cache storages and TLB structures. More particularly, as described above, in one embodiment sequencing hardware in each core may search each cache entry for an address that may fall within the page boundary of the requested page. Similarly, the sequencing hardware may search each TLB entry by physical address for an address that may fall within the page boundary of the requested page. Memory controller 16A may hold the request pending until all probe responses are received.

If all returned probe responses indicate that no other processor core has a copy of the requested page (block 350), the requesting processor core 50 sets the private page bit in the TLB page state field of the corresponding TLB entry (block 355). As shown above, the page state encoding may be 1, 1. In one embodiment, memory controller 16A may return the requested data as a cache fill for modification (block 360). In other embodiments, memory controller 16A may write the data to the locations specified in the write request. If however, a SuperProbe returns a probe hit response (block 350), processor core 50 may use normal coherence handling on a cache line granularity, since the page is not private (block 365).

Referring back to block 305, if a memory request hits in the TLB, and the request is a store operation (block 330), control logic 215 may check whether this is a first store access after a previous TLB miss using the page attributes and the page state (block 335). If the request is a first store operation after a TLB miss, operation proceeds as described above in conjunction with block 340, where memory controller 16A issues a SuperProbe.

Referring back to block 335, if the store operation hits in the TLB 220, and control logic 215 determines it is not the first access after request, and the page is private (block 370), processor core 50 sends the store operation to memory controller 16A with a private page attribute indicating the page is private (block 375). In one embodiment, the store request may be a write command packet that includes a private page attribute field that has an encoded value indicating the page is private. Probe filter 17A may then allocate an entry for the directory information and mark the entry as modified (block 380). Operation proceeds as described above in conjunction with block 360, where no probes are issued and memory controller 16A may return the requested data for modification.

Referring back to block 370, if control logic 215 determines the requested page is not private, operation proceeds as described above in conjunction with block 320, where processor core sends the request to memory controller 16A, and probe filter 17A determines whether to send a probe. Similarly, in block 330, if the request is not a store operation and there is a hit in TLB 220, operation proceeds as described above in conjunction with block 320, where processor core sends the request to memory controller 16A.

Figure 4:
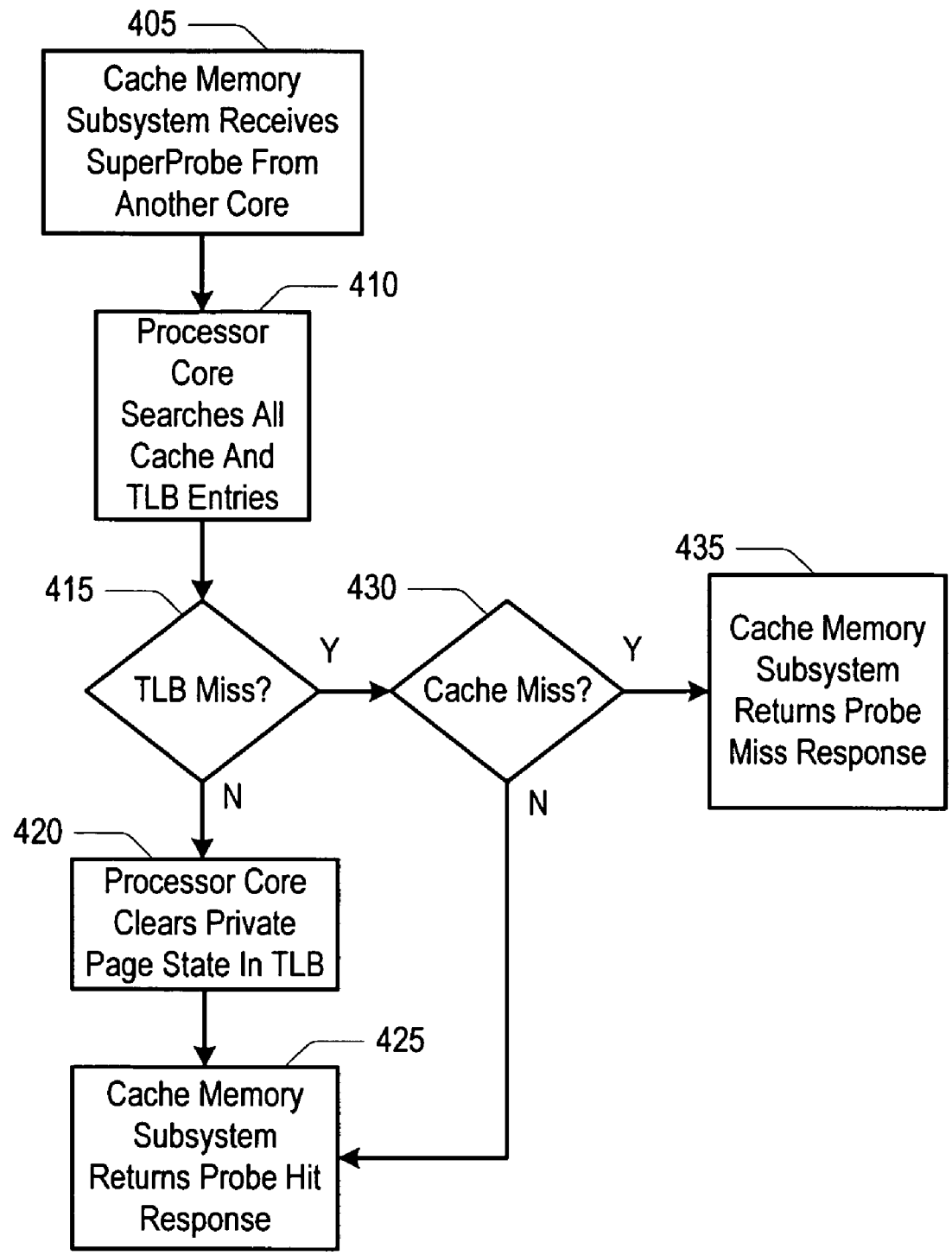
FIG. 4 is a flow diagram describing the further operation of the embodiments shown in FIG. 1 and FIG. 2.

FIG. 4 is a flow diagram describing further operation of the embodiments shown in FIG. 1 and FIG. 2. Referring collectively now to FIG. 1, FIG. 2 and FIG. 4, During operation, if cache memory subsystem 52 receives a SuperProbe from any other memory controller 16A in the computer system (block 405), cache memory subsystem 52 notifies control logic 215. As described above, control logic 215 (e.g., sequencing hardware) begins searching all cache entries in the cache subsystem for an address that matches the range of addresses in the requested page. In addition control logic 215 searches each TLB entry (by physical address), for an address that matches the range of addresses in the requested page (block 410).

If there is a hit in the TLB 220 (block 415), control logic 215 clears the private page bit in that corresponding TLB entry (block 420). In addition, cache memory subsystem 52 issues a probe hit response to the requesting processor core (block 425). Similarly, if there is a TLB miss and a cache hit (block 430), cache memory subsystem 52 issues a probe hit response (block 425). However, if there is a TLB miss and a cache miss (block 430), cache memory subsystem 52 issues a probe miss response (block 435) to the requesting processor core.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
  a processor core;
  interface logic coupled to the core and configured to control communication with other processors;
  an address translation storage structure coupled to the processor core and having a plurality of entries, each corresponding to a memory page, wherein each entry includes a physical address of a memory page, and a private page indication that indicates whether any other processor has an entry, in either a respective address translation storage structure or a respective cache memory, that maps to the memory page;

a memory controller coupled between the processor core and a local system memory and configured to inhibit issuance of a probe message to each other processor in response to receiving a write memory request to a given memory page, wherein the write request includes a private page attribute that is associated with the private page indication, and that indicates that no other processor has an entry, in either the respective address translation storage structure or the respective cache memory, that maps to the memory page; and wherein in response to receiving a write memory request to a particular memory page that includes an attribute that indicates the write memory request is a first write memory request subsequent to a first access for the particular memory page, the memory controller is further configured to issue a specific probe message to each other processor, wherein the specific probe message causes each other processor core to search each entry of the respective address translation storage structure and each entry of the respective cache structure for any address that maps to the particular memory page.

2. The processor as recited in claim 1, wherein the private page indication comprises a bit maintained in hardware and inaccessible to software executing on the processor core.

3. The processor as recited in claim 1, wherein the memory controller is configured to issue the probe message to each other processor in response to receiving a write memory request to the given memory page, wherein the write request includes the private page indication that indicates that at least one other processor has an entry that maps to the memory page in either the respective address translation storage structure or the respective cache memory.

4. The processor as recited in claim 1, wherein the processor core further comprises control logic configured to search each entry of the respective address translation storage structure and each entry of the respective cache memory for any address that maps to a requested memory page in response to receiving, from a requesting processor, the specific probe message corresponding to the requested memory page.

5. The processor as recited in claim 4, wherein in response to finding an entry of the address translation storage structure that maps to the requested memory page, the control logic is configured to issue a probe hit response message to the requesting processor.

6. The processor as recited in claim 4, wherein in response to finding a cache line in the cache memory that maps to the requested memory page, the control logic is configured to issue a probe hit response message to the requesting processor.

7. The processor as recited in claim 1, wherein the private page attribute comprises an encoding in a memory request packet sent to the memory controller.

8. The processor as recited in claim 1, wherein in response to receiving a probe miss from each other processor in response to the specific probe message, control logic of the processor core is configured to cause the private indication to indicate no other processor has an entry, in either a respective address translation storage structure or a respective cache memory, that maps to the memory page.

9. A multiprocessor computer system comprising:
a plurality of processors coupled together via an interconnect fabric, wherein each of the processors includes:
a processor core;
an address translation storage structure coupled to the processor core and having a plurality of entries, each corresponding to a memory page, wherein each entry includes a physical address of a memory page, and a private page indication that indicates whether any other processor has an entry, in either a respective address translation storage structure or a respective cache memory, that maps to the memory page;

a memory controller coupled between the processor core and a local system memory and configured to inhibit issuance of a probe message to each other processor in response to receiving a write memory request to a given memory page, wherein the write request includes a private page attribute that is associated with the private page indication, and that indicates that no other processor has an entry, in either the respective address translation storage structure or the respective cache memory, that maps to the memory page; and wherein in response to receiving a write memory request to a particular memory page that includes an attribute that indicates the write memory request is a first write memory request subsequent to a first access for the particular memory page, the memory controller is configured to issue a specific probe message to each other processor, wherein the specific probe message causes each other processor core to search each entry of the respective address translation storage structure and each entry of the respective cache structure for any address that maps to the particular memory page.

10. The computer system as recited in claim 9, wherein the private page indication is inaccessible to software executing on the processor core.

11. The computer system as recited in claim 9, wherein the memory controller is configured to issue the probe message to each other processor in response to receiving a write memory request to the given memory page, wherein the write request includes the private page attribute that indicates that at least one other processor has an entry that maps to the memory page in either the respective address translation storage structure or the respective cache memory.

12. The computer system as recited in claim 9, wherein the processor core further comprises control logic configured to search each entry of the respective address translation storage structure and each entry of the respective cache memory for any address that maps to a requested memory page in response to receiving, from a requesting processor, the specific probe message corresponding to the requested memory page.

13. The computer system as recited in claim 12, wherein in response to finding an entry of the address translation storage structure that maps to the requested memory page, the control logic is configured to issue a probe hit response message to the requesting processor.

14. The computer system as recited in claim 12, wherein in response to finding a cache line in the cache memory that maps to the requested memory page, the control logic is configured to issue a probe hit response message to the requesting processor.

15. The computer system as recited in claim 9, wherein the private page attribute comprises an encoding in a memory request packet sent to the memory controller.

16. The computer system as recited in claim 9, wherein in response to receiving a probe miss from each other processor in response to the specific probe message, control logic of the processor core is configured to cause the private indication to indicate no other processor has an entry, in either a respective address translation storage structure or a respective cache memory, that maps to the memory page.

17. A method comprising:
storing an address translation of a memory page within an entry of a translation storage of a processor;
storing within the entry of the translation storage, a private page indication that indicates whether any other processor has an entry, in either a respective address translation storage structure or a respective cache memory, that maps to the memory page;
a processor core issuing a write memory request including a private page attribute that is associated with the private page indication; and
a memory controller inhibiting issuance of a probe message to each other processor in response to receiving the write memory request, wherein the private page attribute indicates that no other processor has an entry, in either the respective address translation storage structure or the respective cache memory, that maps to the memory page;
wherein in response to receiving a write memory request to a particular memory page that includes an attribute that indicates the write memory request is a first write memory request subsequent to a first access for the particular memory page, the memory controller issuing a specific probe message to each other processor, wherein the specific probe message causes each other processor core to search each entry of the respective address translation storage structure and each entry of the respective cache structure for any address that maps to the particular memory page.

18. The method as recited in claim 17, further comprising the memory controller issuing the probe message to each other processor in response to receiving a write memory request to the given memory page, wherein the write memory request includes the private page attribute that indicates that at least one other processor has an entry that maps to the memory page in either the respective address translation storage structure or the respective cache memory.

19. The method as recited in claim 17, further comprising control logic searching each entry of the respective address translation storage structure and each entry of the respective cache memory for any address that maps to a requested memory page in response to receiving, from a requesting processor, the specific probe message corresponding to the requested memory page.

20. The method as recited in claim 17, further comprising control logic of the processor core causing the private indication to indicate no other processor has an entry, in either a respective address translation storage structure or a respective cache memory, that maps to the memory page in response to receiving a probe miss from each other processor in response to the specific probe message.

21. A multiprocessor computer system comprising:
a plurality of processors coupled together via an interconnect fabric, wherein each of the processors includes:
a processor core;
an address translation storage structure coupled to the processor core and having a plurality of entries, each entry corresponding to a memory page, wherein each entry includes a private page indication that indicates whether any other processor has an entry that maps to the memory page;
a memory controller coupled between the processor core and a local system memory and configured to issue a specific probe message to each other processor in response to receiving a write memory request to a particular memory page that includes an attribute that indicates the write memory request is a first write memory request subsequent to a first access for the particular memory page, wherein the specific probe message causes each other processor to search each respective address translation storage structure and each cache structure for any address that maps to the particular memory page;
wherein control logic of the processor core is configured to cause the private indication to indicate no other processor has an entry that maps to the memory page in response to the memory controller receiving a probe miss corresponding to the specific probe message from each other processor.

* * * * *

UNITED STATES PATENT AND TRADEMARK OFFICE
CERTIFICATE OF CORRECTION

PATENT NO.        : 7,669,011 B2                                        Page 1 of 1
APPLICATION NO. : 11/644488
DATED             : February 23, 2010
INVENTOR(S)       : Patrick N. Conway It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Seventh Day of December, 2010

David J. Kappos
*Director of the United States Patent and Trademark Office*